United States Patent [19]

Takeda

[11] 3,879,136

[45] Apr. 22, 1975

[54] METHOD AND SYSTEM UTILIZING MOIRE CONTOURS FOR DIGITAL GONIOMETRY

[75] Inventor: Hideomi Takeda, Tokyo, Japan

[73] Assignee: Asahi Kogaku Kogyo Kabushiki Kaisha, Tokyo, Japan

[22] Filed: July 26, 1973

[21] Appl. No.: 382,877

[30] Foreign Application Priority Data

July 28, 1972 Japan .............................. 47-75690

[52] U.S. Cl.......... 356/209; 250/231 SE; 250/237 G

[51] Int. Cl......................... G01m 21/48; G01d 5/34

[58] Field of Search .................. 250/237 G, 237 SE; 356/209

[56] References Cited

UNITED STATES PATENTS

| | | | |
|---|---|---|---|
| 3,244,895 | 4/1966 | Anderegg, Jr. | 250/231 SE |
| 3,364,359 | 1/1968 | Cronan | 250/231 SE |
| 3,524,067 | 8/1970 | West | 250/237 G |
| 3,714,448 | 1/1973 | Cronan | 250/231 SE |
| 3,742,486 | 6/1973 | Skidmore | 250/231 SE |

*Primary Examiner*—Vincent P. McGraw
*Attorney, Agent, or Firm*—Steinberg & Blake

[57] ABSTRACT

A goniometry system and method where light is directed through a stationary transmissive diffraction grating situated in a grating plane which extends across a predetermined axis about which a rotary body is turned, this body having directed toward the grating plane at the side thereof opposite from the source of the light a flat reflecting surface situated in a plane inclined at an angle other than a right angle to the latter axis for reflecting light which has passed through the grating to a photosensitive unit which converts the light into a corresponding electrical signal which is then converted into pulses which provide a predetermined unit angle. In this way the above optical system provides a moire pattern contour which is converted into a corresponding electrical signal which provides the series of pulses indicative of the predetermined unit angle.

16 Claims, 13 Drawing Figures

METHOD AND SYSTEM UTILIZING MOIRE CONTOURS FOR DIGITAL GONIOMETRY

BACKGROUND OF THE INVENTION

The present invention relates to goniometry methods and devices.

In particular, the present invention relates to a system and method of digital goniometry utilizing a moire pattern contour for general goniometry or optical measurement of a rotary angle.

It is already known to determine from a moire pattern contour appearing on an object a three-dimensional configuration of the object. However, this latter principle has been used up to the present time for determining a surface configuration of a three-dimensional object, whereas with the present invention a moire pattern contour is utilized for digital goniometry.

There are various types of known digital goniometers such as goniometer utilizing a moire pattern formed by two gratings, a goniometer utilizing magnetism, known as an inductosyn type of goniometer, and a photoelectric goniometer utilizing stationary and rotary slits. However, these known goniometers have drawbacks with respect to the high cost thereof as well as with respect to maintenance thereof since the known goniometers require a plurality of slits or coils which must be manufactured with an extremely high degree of precision. In addition, the known goniometers have the drawback of structural difficulty in axially coordinating stationary and rotary discs.

SUMMARY OF THE INVENTION

It is accordingly a primary object of the present invention to provide a goniometry method and system which will avoid the above drawbacks.

In particular, it is an object of the present invention to provide a system and method of digital goniometry utilizing a principle according to which distribution of a moire pattern contour established by a planar object and a single transmissive diffraction grating which is at an angle to the planar object gives a displacement in a direction which is perpendicular to the grating surface.

It is moreover an object of the present invention to provide goniometry methods and systems which enable the sensitivity of the measurement to be replaced.

Also it is an object of the present invention to provide goniometry systems and methods which enable the unit angle or interval between pulses to be adjusted.

Furthermore, it is an object of the present invention to provide goniometry systems and methods which do not require a degree of planar precision which is difficult to achieve and which are not undesirably influenced by a certain amount of axial skew.

According to the goniometry system and method of the invention, light from a predetermined light source means is directed through a stationary transmissive diffration grating means which is situated in a predetermined grating plane which extends across a predetermined axis. A rotary body supported for rotation about the latter axis on the side of the grating plane opposite from the light source means has a flat reflecting surface directed toward the grating plane and situated in a reflecting plane which is inclined with respect to the latter axis at an angle other than a right angle so that the light travelling through the grating means will be reflected from the reflecting surface at a predetermined reflecting point situated in the reflecting plane which contains the reflecting surface. In this way during rotation of the rotary body the reflecting point sinusoidally advances toward and recedes from the grating plane. A photosensitive means is situated at the same side of the grating plane as the light source means for receiving the reflected light and converting the latter into a corresponding signal which is transmitted to an electrical circuit means which converts the signal into a series of pulses indicative of the predetermined unit angle.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
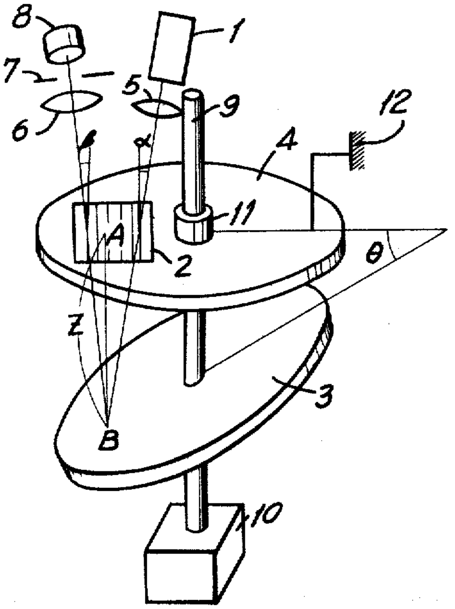
FIG. 1 is a schematic perspective illustration of a preferred embodiment of the method and system of the invention.

Referring to FIG. 1, there is schematically illustrated therein an embodiment of the invention which also serves to illustrate the principle on which the present invention is based. In FIG. 1 there is schematically represented a light source means 1 from which a light beam travels through a collimator lens 5 to be enlarged thereby into a parallel beam which continues to travel through a stationary transmissive diffraction grating means 2 carried by a stationary plate or disc 4 which is situated in a grating plane in which the stationary grating means 2 is located. Thus, the light source means 1 serves to direct light through the stationary grating means 2 which is in the grating plane occuplied by the stationary disc 4. The grating plane in which the plate 4 is located extends in the illustrated example perpendicularly across a predetermined axis, this latter axis coinciding with the axis of an elongated rotary shaft 9 supported for rotation in a ball bearing 11 or the like carried by the stationary plate or disc 4. Thus the shaft 9 extends through a central opening of the disc 4 where the latter carries the bearing 11. Any suitable stationary fixture, bracket, or the like 12, schematically represented in FIG. 1, is fixed with the plate or disc 4 so as to maintain the latter stationary while the shaft 9 is free to rotate.

The shaft 9 fixedly carries on the side of the grating plane opposite from the light source means 1 a rotary body 3 which rotates with the shaft 9, this body 3 having a flat reflecting surface directed toward the grating plane and inclined with respect to the shaft 9 and thus with respect to the axis thereof at an angle other than a right angle, so that the upper reflecting surface of the body 3, which is directed toward the grating plane, is contained in a reflecting plane which makes with the grating plane the angle $\theta$ , as illustrated in FIG. 1. The rotary body 3 which is fixed to the shaft 9 for rotation therewith may take the form of a disc made of metal and having an upwardly directed polished surface which will reflect light after it has passed through the grating means 2 from a reflecting point B which is situated in the reflecting plane. Thus, as the body 3 rotates the reflecting point B will sinusoidally advance toward and recede from the grating plane.

As is well known, the beam which is incident upon the rotary disc 3 may be seen through the grating 2 in order to obtain a moire pattern contour. Assuming that the rotary body 3 is stationary, this rotary body which participates in the formation of the moire pattern contour has the above inclination $\theta$ with respect to the grating plane which contains the grating means 2 so that the resulting contour is in the form of a continuous grating of equal pitch. It is well known that the light intensity of the resulting moire pattern contour varies in the pitch direction in the form of a sinuisoidal wave which is either amplified or damped. Assuming now that the body 3 is rotating, and for this purpose a suitable drive means 10 is operatively connected with the shaft 9 to rotate the latter about its axis, while the grating means 2 remains stationary since the disc 4 in the grating plane is held stationary by the means 12, then it is clear that the distance Z along a line parallel to the axis of the shaft 9 between the reflecting point B and a point A in the grating plane, this latter point A of course being fixed, will continuously vary in the manner pointed out above, and the variation of the magnitude of the distance Z will be continuous and within a range which may be expressed by:

$H - r \tan \theta < Z < H + r \tan \theta$ during rotation of the disc 3, where H is the distance between the centers of the stationary disc 4 and the rotary disc 3, or in other words the distance along the axis of the shaft 9 between the grating plane and reflecting plane, while $r$ is the distance in the grating plane between the axis of the shaft 9 and the fixed point A. Therefore, the contour appearing at the movable reflecting point B progressively varies and the light intensity thereof forms a sinusoidal wave either damped or amplified as pointed out above.

The light reflected from the reflecting point B is received by a photosensitive means 8 in the form of a photocell or other photoelectric elements. Thus, in the illustrated example the continuously varying contour is focussed through a condenser lens 6 on a slit 7 situated in a suitable plane and then the reflected light is photoelectrically converted by the photoelectric element 8 which is situated along the optical axis of the reflected light just behind the slit 7. In this way the photosensitive means 8 will provide a photoelectric signal train during rotary movement of the body 3.

Figure 2:
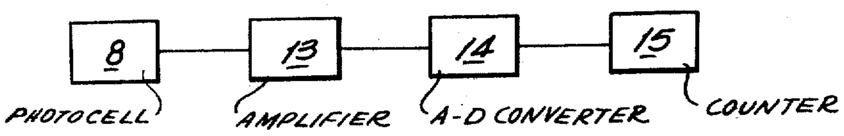
FIG. 2 is a schematic representation of an electrical circuit means utuilized with the method and system of FIG. 1.

Referring to the electrical circuit means which is schematically illustrated in FIG. 2, it will be seen that the photosensitive means formed by the photocell or photoelectric element 8 provides an input to an amplifier means 13 which in turn provides an input to an A-D converter 14 providing an input to a counter 15. Thus, through this electrical circuit means the output signal of the photossensitive means 8 is converted into impulses which was counted by the counter 15 so as to provide a digital measurement of the rotary angle of the rotary body or disc 3.

Figure 3A:
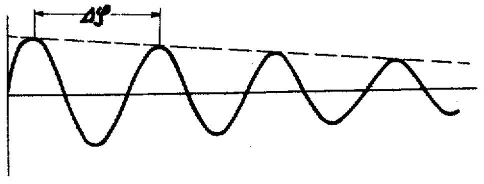
FIG. 3*a* is a graph illustrating the output of a photosensitive means of FIG. 1.
Figure 3B:
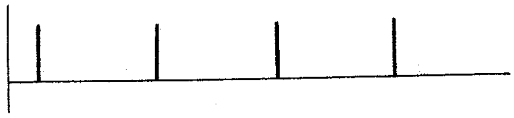
FIG. 3*b* is a graph illustrating pulses derived from the signal of FIG. 3*a* with the electrical circuit means of FIG. 2.

FIG. 3*a* illustrates the output signal of the photosensitive means 8, and it is this signals which is amplified by the amplifier 13 and converted by the A-D converter 14 into the pulses illustrated in FIg. 3*b* and thereafter counted by the counter 15.

The contour which is illustrated by the output wave form shown in FIG. 3*a* has a pitch Δ100 , which is an indication of the unit angle obtained according to the principle of the present invention or in other words an indication of the sensitivity of the measurement.

This measurement sensitivity $\Delta\phi$ may be given by the formula:

$$\Delta\phi = 2 \sin^{116\ 1} p/2r \tan \theta \ (\tan \alpha + \tan \beta ) \qquad (1)$$

where $p$ is the pitch of the grating 2, $r$ is the radial distance in the grating plane from the axis of the shaft 9 to the fixed point A at the grating 2, as pointed out above, $\theta$ is the angle between the grating plane and the reflecting plane, and $\alpha$ and $\beta$ are respectively the incident angle and the observation or reflecting angle, the latter angles being illustrated in FIG. 1. By way of a specific example, assuming that $p = 0.1$ mm, $r = 50$ mm, $\theta = 20°$ and $\alpha = \beta = 45°$, $\Delta \phi = 9.5$ inch and a measurement at a sensitivity on the order of 1 bit ≈ 10 inch is provided.

According to the principle on which the present invention is based, the contrast of the moire pattern contour varies as Z varies, and the signal which is obtained, as illustrated in FIG. 3*a*, from the photosensitive means in the form of a photoelectric output thereof may conveniently be processed by, for example, automatic gain control or zero crossing. Although a noticeable contrast variation is provided in the case of an incoherent light source forming the light source means 1, this variation may be reduced by using a coherent light source such as a laser beam.

Consideration should be given to the sensitivity of the length measurement obtained with the goniometer of the present invention. In order to produce a series or train of pulses for every predetermined length measurement digit from a signal which is photoelectrically converted from the moire pattern contour, as illustrated in FIG. 3*a*, it is possible to use the so-called zero cross processing, and in this case the length digit will be one half of the period of the signal. Thus, in the above specific numeral example, the measurement sensitivity of 1 bit ≈ 5 inch will be achieved. The measurement sensitivity described above may be considered as obtainable by prior art devices.

Figure 4:
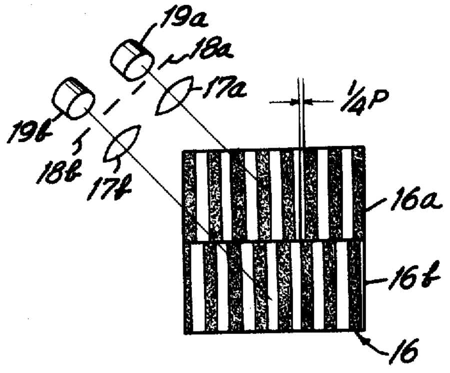
FIG. 4 is a schematic representation of another embodiment of the invention where a pair of grating portions are out of alignment by a predetermined fraction of the pitch between the grating lines.

It is possible, however, to improve the sensitivity by modifying the known devices in accordance with further features of the invention in the manner described in the examples below. A first possible modification is illustrated in FIG. 4. In the example of FIG. 4 the grating means 16, which would replace the grating means 2 and which would still be located in the grating plane occupied by the stationary plate or disc 4, is composed of a pair of grating components or portions 16*a* and 16*b* which have an equal pitch but which are out of alignment with respect to each other according to a predetermined fraction of this pitch. It will be seen that in the example of FIG. 4, the pair of grating portions 16*a* and 16*b* are out of alignment with each other by one fourth pitch. These two component grating portions receive light from a light source means which may be a pair of light source means respectively positioned for reflecting separate beams respectively through the separate grating portions 16*a* and 16*b*, so that there will be a pair of reflecting points at the reflecting plane, corresponding to the point B shown in FIG. 1, and from these reflecting points the light is reflected to the pair of condenser lenses 17*a* and 17*b* illustrated in FIG. 4, so that the light is focussed at the slits 18*a* and 18*b*, each of which corresponds to the slit 7 of FIG. 1, with the pair of reflected light beams thus being received by a pair of photosensitive means 19*a* and 19*b*, as schematically illustrated in FIG. 4.

Thus, with this arrangement and method which is illustrated in FIG. 4, in conformance with the principle of the present invention, it is possible to obtain a pair of photoelectric outputs in the form of sinusoidal and cosinusoidal waves, with a measurement sensitivity of one fourth of the signal period $\Delta\phi$ by the zero crossing process. Furthermore, it is possible with an arrangement as illustrated in FIG. 4 to achieve the further advantage of being capable of discriminating the direction of rotation by subjecting the pair of signals to electrical processing.

Figure 5:
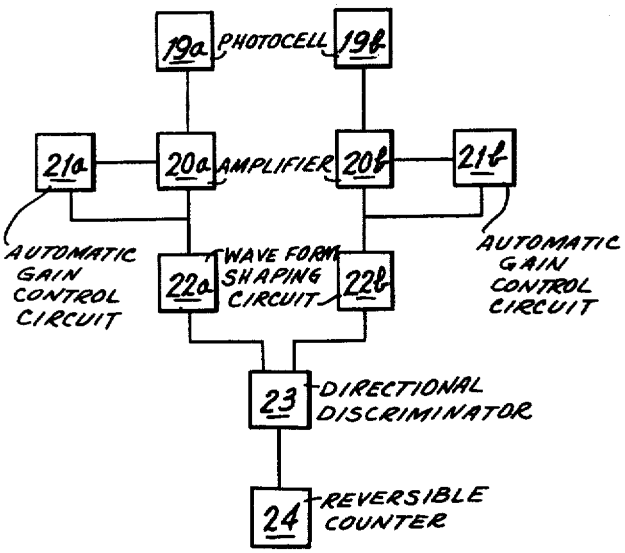
FIG. 5 is a schematic representation of an electrical circuit means for processing a pair of signals.

FIG. 5 shows an electrical circuit means, by way of example, enabling such a directional discrimination to be achieved. The pair of photocells 19*a* and 19*b* are schematically represented in FIG. 5 and respectively provide a pair of inputs to the pair of amplifiers 20*a* and 20*b*, which are respectively connected with the automatic gain control circuits 21*a* and 21*b*, which act as feedback circuits associated with the amplifiers, the outputs from the latter being delivered to the wave form shaping circuits 22*a* and 22*b* which shape the signals and provide an input to the directional discriminator 23 with the latter providing the output to the reversible counter 24 which counts the pulses.

Figures 6A, 6B, 6C, 6D:
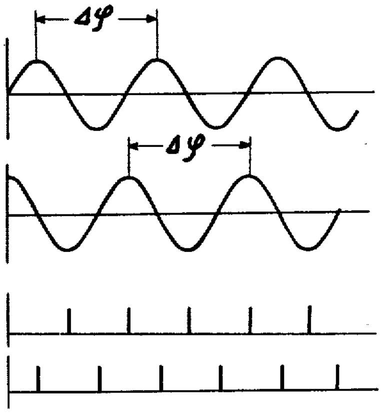
FIG. 6*a* and 6*b* respectively illustrate sinusoidal and cosinusoidal wave signals, while FIGS. 6*c* and 6*d* respectively illustrate series of pulses derived respectively from the signals of FIGS. 6*a* and 6*b* with the electrical circuit means.

FIGS. 6*a* and 6*b* respectively illustrate the sinusoidal and cosinusoidal waves which form the output of the pair of photosensitive means 19*a* and 19*b*, with these outputs respectively being converted into the series or train of pulses illustrated in FIGS. 6*c* and 6*d*, as a result of the A-D conversion by zero cross processing of the signals illustrated in FIGS. 6*a* and 6*b*, respectively.

Figure 7A:
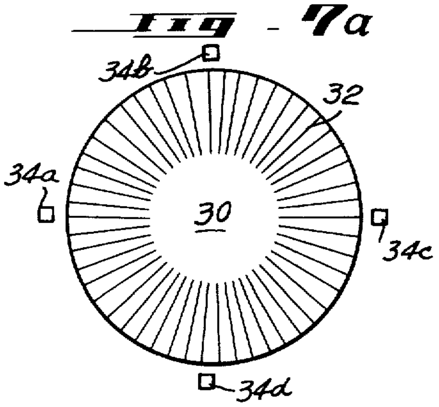
FIG. 7*a* is a schematic illustration of a radial grating and a plurality of photocells associated therewith.
Figure 7B:
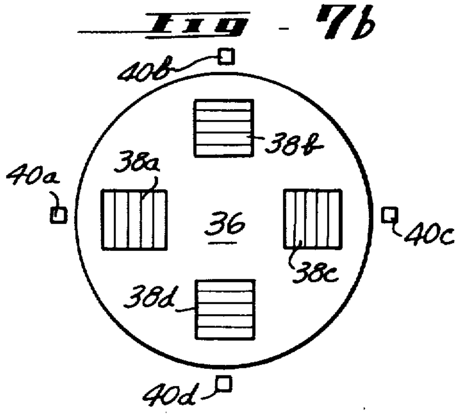
FIG. 7*b* is a schematic illustration of the distribution of a plurality of rectangular gratings and photocells associated therewith.

According to a further modification of the present invention, the grating means may take the form illustrated in FIG. 7*a* where there are a plurality of radial grating portions 32 uniformly distributed on the stationary plate 30 which corresponds to the disc 4 and is located in the grating plane, while FIG. 7*b* shows an arrangement of four separate grating portions 38*a*–38*d* of rectangular configuration circumferentially distributed about the axis of the shaft 9 in a uniform manner and carried by a stationary plate or disc 36 which corresponds to the disc 4, so that this disc 36 is also located in the grating plane and the shaft 9 extends rotatably through the disc 36 as well as through the disc 30 in the manner described above in connection with the disc 4, as illustrated in FIG. 1. Of course, it is to be understood that a plurality of the optical systems illustrated in FIGS. 1 and 4 are uniformly distributed circumferentially about the axis of rotation of the rotary body 3 in the case of FIGS. 7*a* and 7*b*, so that there will be, for example, four uniformly distributed light sources directing four beams through the grating portions to be reflected from the reflecting plane and received by photoelectric converters which are located at corresponding positions for equally dividing the period $\alpha\ \phi$ of the moire pattern contour. This arrangement is schematically represented in FIG. 7*a* by the four photocells 34*a*–34*d* and in FIG. 7*b* by the four photocells 40*a*–40*d*, these photocells or photoelectric elements respectively corresponding to and operating in the same way as any of the above photosensitive means 8 or 19*a*, 19*b*.

A third possible modification according to the invention involves the use of a synchro-resolver or a computing trains to divide and interpolate a photoelectric signal in a digital manner, and of course this particular modification involves the use of well known components so that further detailed description thereof is not given.

The above features of the invention for improving the sensitivity also enable the sensitivity measurement to be variable. This is achieved by utilizing a plurality of grating portions which respectively have different pitches, according to the first two of the above sensitivity inprovements according to the invention, while with the third type of improvement which has not been described in detail, it is possible to make the division interval variable through a suitable electrical operation so that with all of the above three systems for improving the sensitivity it is possible to achieve a series of train or pulses having an optional length measurement digit. Thus, in order to provide a variable measurement sensitivity the pitches of the grating portions 16*a* and 16*b* may be different, while with respect to FIGS. 7*a* and 7*b*, the pitches of the various grating portions illustrated may also be different from each other. Thus it is possible to render the measurement sensitivity variable with an arrangement according to which the desired degree of sensitivity can be selectively obtained by utilizing, for example, a simplified switching circuit. Also, it is clear that in accordance with the principle of the present invention, it is possible to render the sensitivity of the measurement variable by an arrangement according to which the incident angle $\alpha$ and the reflecting or observation angle $\beta$ illustrated in FIG. 1 are capable of being adjusted, so that by varying the latter angles it is also possible to achieve a selected degree of measurement.

The factors of the planar precision of the reflecting surface of the rotary body 3 as well as the axial skew thereof should also be taken into consideration with respect to their possible influence on the precision of the measurement. In order to avoid an influence of a planar precision $h$ of the rotary disc or body 3 on the precision of the measurement, a relationship $$h \cos\theta < p/(\tan\alpha + \tan\beta) \qquad (2)$$

must be satisfied. Assuming $p = 0.1$ mm, $\theta = 20°$ and $\alpha = \beta = 45°$, there is the establishment of a relationship $h < 0.05$ mm, and a planar precision of 50 $\mu$ is required. A planar precision of this latter order is easy to achieve, so that the desired degree of precision can be readily achieved with the present invention.

Figure 8:
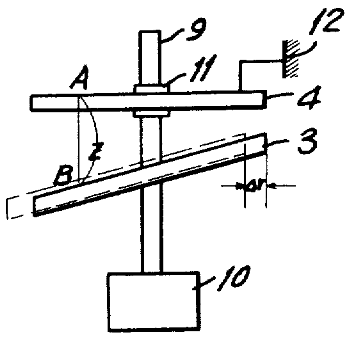
FIG. 8 is an illustration of the effect of axial skew.

An error of measurement which may possibly be caused by axial skew with the goniometer of the present invention, on the other hand, is related to the relative positions between the stationary and rotary components 4 and 3, and therefore, the rotary body 3 should be considered in this connection. Referring to FIG. 8, it will be seen that the difference between the solid and dotted line positions of the rotary body 3 illustrated are brought about by an axial skew in the radial direction having the illustrated magnitude $\Delta r$, this skew of the rotary disc or body 3 with respect to its axis of rotation. As a result of such skew, the distance Z between the fixed point A and the reflecting point B will vary, but the angle $\theta$ will remain constant. As a result, the period of the contour will also remain constant, and it is therefore apparent that axial skew of the rotary body or disc 3 has no influence upon the precision of the measurement. The same is of course also true with respect to any axial skew of the stationary disc 4.

Although the invention has been described above without mentioning any particular types of light source means, it is not absolutely essential that the light source means 1 be of a coherent type, such as a laser. It is also possible to use an incoherent type of light source means, such as a mercury-arc lamp, which is also effective to bring about the desired results. However, use of a laser beam provides a moire pattern contour of a higher contrast due to its own great brightness and coherency, so as to facilitate in this way the electrical processing of the photoelectric output. In addition, the manner in which the gratings are illuminated may be other than parallel, as pointed out above, and it is well known that the use of a diffusing illumination will also produce a similar moire pattern contour. It should be noted, as is known from the theory relating to moire pattern contour, that the light source means and the observation point where the photosensitive means is located should be equally spaced from the surface of the grating in order to maintain the relationship set forth by the above formula (1). Although the particular surface configuration of the rotary disc or body 3 has been described, this body may in practice take the form of any material having a good reflection surface such as a mirror, a metallic surface, or even objects which have surfaces of high diffusion such as a plated surface or a coated surface.

Thus, in accordance with the description above it will be seen that the goniometry system and method according to the present invention provides the following features.

i. The setting and maintenance of the device of the invention is easy and convenient to carry out. The device is structurally simple and free of the problem of axial skew encountered with conventional devices where the axial skew has an undesirable influence on the precision of the measurement.

ii. A high degree of economy is achieved with the invention since the device of the present invention requires only a single set of gratings and the inclined reflecting surface which is inclined with respect thereto. The manufacturing precision as well as the setting precision which are required for the device of the invention are not excessively stringent, so that manufacturing tolerances commonly encountered are fully acceptable with the device of the invention.

iii. The device of the present invention is rugged and highly durable inasmuch as the present invention utilizes a principle based on so-called non-contact goniometry, and the device is structurally simple, as pointed out above.

In practice, the system and method of the present invention may be used for goniometry purposes with various machine tools, for controlling the positioning of components, and for angular detection in general.

What is claimed is:

1. In a goniometry method, the steps of directing light through a stationary transmissive difraction grating which is situated in a grating plane to a reflecting point situated in a reflecting plane which is inclined to said grating plane to provide a moire pattern contour and which is formed by a flat reflecting surface of a rotary body which has an axis of rotation passing through both of said planes at an angle other than a right angle with respect to said reflecting plane, rotating said body about said axis of rotation thereof so that the reflection point of said reflecting plane sinusoidally approaches and recedes from said grating, to provide a continuously varying moire contour, converting light reflected from said reflecting point into an electrical signal having properties corresponding to the properties of the reflected light resulting from the continuously varying moire contour, and converting said electrical signal into a series of pulses indicative of a predetermined unit angle.

2. In a method as recited in claim 1 and wherein light is simultaneously directed from a plurality of sources equidistantly distributed circumferentially about said axis through a plurality of grating portions in said grating plane with said grating portions distributed also circumferentially about said axis in the same way as said light sources, so that the light is received at the reflecting plane at a plurality of reflecting points circumferentially distributed about said axis in the same way as said grating portions, and converting light reflected from said plurality of reflecting points in to a plurality of corresponding electrical signals which enable the period of any one signal to be equally divided for increasing the sensitivity of the measurement.

3. In a method as recited in claim 1 and including the steps of simultaneously directing light from a pair of sources through a pair of grating portions in said grating plane which are out of alignment with respect to each other by a predetermined fraction of the pitch between grating lines of each of said grating portions, so that the light travelling through said grating portions provides at said reflecting plane a pair of reflecting points from which light is simultaneously reflected, and converting the latter reflected light into a pair of corresponding electrical signals, and then converting the latter signals into a series of pulses enabling the unit angle to be subdivided and the direction of rotation of the body to be discriminated.

4. In a method as recited in claim 1 and including the step of simultaneously directing light through a plurality of grating portions in said grating plane which respectively have different pitches, so that the light directed through the grating portions will provide at the reflecting plane a plurality of reflecting points from which light is reflected, and converting the latter reflected light into a plurality of corresponding electrical signals while then converting the latter signals into corresponding pulses, whereby the gratings of different pitch enable the sensitivity of the measurement to be varied.

5. In a method as recited in claim 1 and including the step of dividing and interpolating the electrical signal into which the reflected light is converted for increasing the sensitivity of the measurement.

6. In a method as recited in claim 1 and including the step of adjusting the angle of incidence and reflection of the light travelling to and from said reflected point for adjusting the sensitivity of the measurement.

7. In a method as recited in claim 1 and wherein the light is a coherent type of light such as that derived from a laser.

8. In a method as recited in claim 1 and wherein the light is an incoherent type of light such as that derived from a mercury-arc lamp.

9. In a digital goniometer, an optical system for providing a moire pattern contour, said system comprising stationary transmissive diffraction grating means situated in a grating plane which extends across a predetermined axis, light source means situated on one side of said grating plane for directing light through said grating means to the opposite side of said grating plane, and a rotary body situated at said opposite side of said grating plane, supported for rotation about said axis, and having a flat reflecting surface directed toward said grating plane and situated in a reflecting plane which is inclined across said axis at an angle other than a right angle, so that the light from said light source means which travels through said grating means will have a given moire pattern contour to be reflected from said surface in said reflecting plane at a predetermined reflecting point, drive means operatively connected with said rotary body for rotating the latter about said axis so that said reflecting point sinusoidally advances toward and recedes from said grating plane during rotation of said body about said axis, for providing a continuouslyy varying moire contour, photosensitive means situated at the same side of said grating plane as said light source means for receiving light reflected from said reflecting point and for converting the light resulting from said continuously varying moire contour into an electrical signal having properties corresonding to that of the reflected light, so that the moire pattern contour provided by the optical system is converted into a corresponding electrical signal, and electrical circuit means electrically connected with said photosensitive means for converting the signal provided by said photsensitive means into a series of pulses which indicate a predetermined unit angle.

10. The combination of claim 9 and wherein said grating means includes a plurality of stationary grating portions situated in said grating plane and uniformly distributed circumferentially about said axis, a plurality of said light source means situated at said one side of said grating plane for respectively directing light through said plurality of grating portions to be reflected from a plurality of reflecting points in said reflecting plane respectively corresponding to said plurality of grating portions, and a plurality of photosensitive means for receiving light reflected from said plurality of reflecting points and converting the light into corresponding electrical signals, said electrical circuit means being electrically connected with said plurality of photosensitive means for enabling a period of a moire pattern contour to be equally divided.

11. The combination of claim 9 and wherein said grating means includes a pair of grating portions respectively having grating lines of equal pitch but situated with respect to each other out of alignment by a predetermined fraction of said pitch, said optical system including a pair of light sources for respectively directing light through the latter grating portions to be reflected from a pair of reflecting points in said reflecting plane, and a pair of photosensitive means for respectively receiving the reflected light from said pair of points and electrically connected with said electrical circuit means so that the series of pulses indicating the unit angle may be subdivided and so that the direction of rotation of said body can be discriminated.

12. The combination of claim 9 and wherein said grating means includes a plurality of grating portions of different pitches, respectively, enabling the sensitivity of the measurement to be varied.

13. The combination of claim 10 and wherein said grating portions are composed of a series of radially extending grating lines circumferentially distributed about said axis.

14. The combination of claim 10 and wherein said grating portions are made up of a plurality of grating sections which are spaced from each other and uniformly distributed circumferentially about said axis.

15. The combination of claim 9 and wherein said photosensitive means is a photocell, while said electrical circuit means includes an amplifier means electrically connected to said photocell to receive an input therefrom, an A-D converter means electrically connected to said amplifier means for receiving an input from the latter, and a counter means electrically connected with said converter means for receiving an input therefrom.

16. The combination of claim 10 and wherein said plurality of photosensitive means are respectively in the form of a plurality of photocells, said electrical circuit means including a plurality of amplifier means respectively connected electrically with said photocells to receive inputs therefrom, a plurality of wave form shaping circuit means respectively connected electrically with said plurality of amplifier means for receiving an input therefrom, a plurality of automatic gain control circuit means respectively connected electrically between each amplifier means and the wave form shaping circuit means connected thereto for acting as feedback circuits, directional discriminator circuit means electrically connected with said pluralty of wave form shaping circuit means, and reversible counter means electrically connected with said directional discriminator circuit means for receiving an input therefrom.

* * * * *